United States Patent
Kelson

(10) Patent No.: US 9,168,634 B1
(45) Date of Patent: Oct. 27, 2015

(54) WATERJET REMOVAL OF COVERINGS FROM TANGLED WIRE AND LOOSE COILS

(71) Applicant: Arnold A. Kelson, Papillion, NE (US)

(72) Inventor: Arnold A. Kelson, Papillion, NE (US)

(*) Notice: Subject to any disclaimer, the term of this patent is extended or adjusted under 35 U.S.C. 154(b) by 97 days.

(21) Appl. No.: 13/999,012

(22) Filed: Dec. 31, 2013

Related U.S. Application Data

(63) Continuation-in-part of application No. 13/199,145, filed on Aug. 22, 2011, now abandoned, which is a continuation-in-part of application No. 12/803,080, filed on Jun. 18, 2010, now Pat. No. 8,007,563, which is a continuation-in-part of application No. 11/401,565, filed on Apr. 11, 2006, now abandoned.

(60) Provisional application No. 60/714,935, filed on Sep. 8, 2005.

(51) Int. Cl.

| | |
|---|---|
| C22B 15/00 | (2006.01) |
| B24C 3/08 | (2006.01) |
| B24C 1/04 | (2006.01) |
| B24C 1/08 | (2006.01) |
| B08B 3/02 | (2006.01) |
| B29B 17/02 | (2006.01) |

(52) U.S. Cl.
CPC . *B24C 3/081* (2013.01); *B08B 3/02* (2013.01); *B24C 1/045* (2013.01); *B24C 1/086* (2013.01); *B29B 17/02* (2013.01); *B29B 2017/0286* (2013.01); *B29B 2017/0289* (2013.01)

(58) Field of Classification Search
CPC .......... B08B 11/02; B08B 3/02; B08B 3/022; B08B 5/02; B24C 1/086; B24C 3/12; B24C 5/005; B24C 7/0061; B24C 3/081; B24C 1/045; B29B 17/02; B29B 2017/0286; B29B 2017/0289
USPC ................................ 264/504; 75/715; 451/36
See application file for complete search history.

(56) References Cited

U.S. PATENT DOCUMENTS

| | | | |
|---|---|---|---|
| 4,064,884 A | 12/1977 | Asp | 135/15 |
| 4,281,444 A | 8/1981 | Smith | 29/426.5 |
| 5,142,950 A | 9/1992 | Takano et al. | 81/9.51 |
| 5,904,610 A | 5/1999 | Ciniglio et al. | 451/38 |
| 6,130,404 A | 10/2000 | Campagna et al. | 219/121.69 |
| 6,273,790 B1 * | 8/2001 | Neese et al. | 451/38 |

* cited by examiner

*Primary Examiner* — Alison Hindenlang
*Assistant Examiner* — Robert J Grun
(74) *Attorney, Agent, or Firm* — James D. Welch

(57) ABSTRACT

A system for impacting a flow of fluid onto a wire, a bundle of wires, coil of wires and/or cables or other electrical/electronic materials/components that are oriented in a tangle or loose coils etc., and having one or more outer covering materials, and methodology of its use to remove the one or more outer coverings.

18 Claims, 9 Drawing Sheets

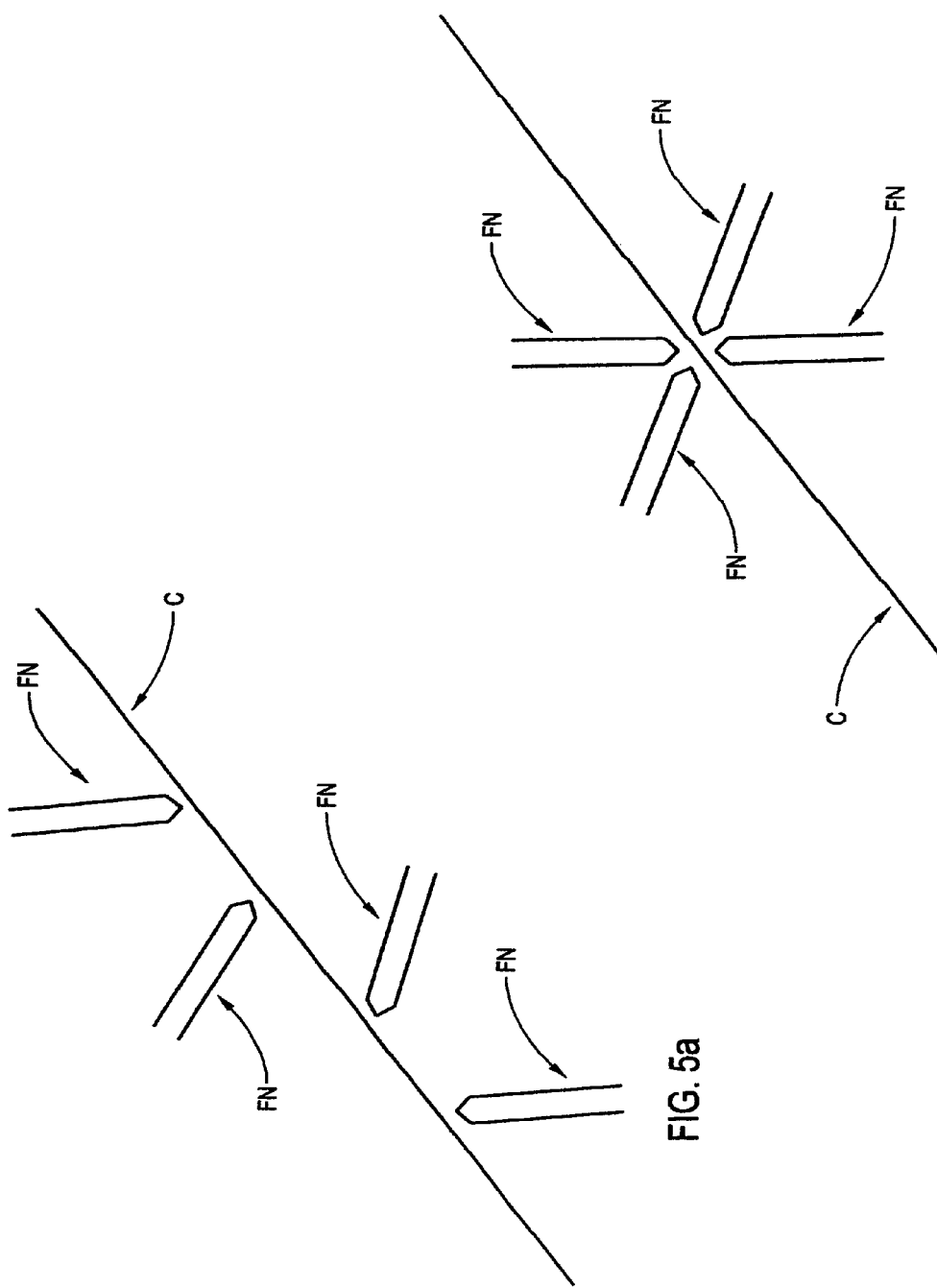

WATERJET REMOVAL OF COVERINGS FROM TANGLED WIRE AND LOOSE COILS

This Application is a CIP of application Ser. No. 13/199,145 Filed Aug. 22, 2011, (Pending), and therevia of Ser. No. 12/803,080 Filed Jun. 18, 2010, (Patented), and therevia of Ser. No. 11/401,565 Filed Apr. 11, 2006, (now abandoned), and therevia Claims Benefit of Provisional Application Ser. No. 60/714,935 Filed Sep. 8, 2005.

TECHNICAL FIELD

The present invention relates to systems for and methods of stripping coverings, (eg. insulation and jacket materials from wires, bundles of wires, coils of wires, cables of wires and the like), and more particularly to a system comprising means for impacting a flow of fluid such as water onto, for instance, mass of tangled and loosely coiled covered wires and/or cable or electronic components etc. which comprise a covering, and methodology of its use.

BACKGROUND

Recycling of materials is a growing industry. One area in which materials are available for recovery includes wires, bundles of wires, coils of wires or cables etc. which comprises a covering material. The covering material, (eg. Teflon®, polyethylene, polyvinyl-chloride, fluoropolymers and other polymers or the like), is valuable as is the metal encompassed thereby, however, a reliable approach to separating the covering and the underlying metal is prerequisite to achieving recycling benefits.

The presently preferred approach of removing coverings from wires is to chop them into short lengths (eg. 1-2 millimeters); which has the effect of liberating the covering material from the underlying wire. The materials are then separated by various methods, such as by those which exploit the difference in particle size and density of the wire and the covering.

A Search of Patents has provided:

U.S. Pat. No. 4,281,444 to Smith which describes use of a needle-like jet of fluid to cut into the outer jacket of a cable to allow its separation from the inner core thereof without damaging the inner core. The jacket is separated from the inner core and each is taken-up by a separate reel. Use of multiple jets is also mentioned.

U.S. Pat. No. 5,142,950 to Takano Takahashi mentions use of a water jet to peel insulation off an intermediate section of wire, but describes use of blades to cut out and mechanically remove an intermediate portion of a covering.

U.S. Pat. No. 5,904,610 to Hall describes use of a stream of baking soda powder particles to strip hard enamel coatings by abrasion at intermediate sections while leaving underlying wire unharmed. Nozzles are positioned and oriented to provide the stream at a 45 or 90 degree angle, and the nozzles are rotated 120 degrees with respect to one another around the circumference of the wire.

U.S. Pat. No. 6,130,404 to Campagna et al. describes use of lasers to remove plastic coating on a metal tube. Use of a jet of ultraclean water is mentioned as a means to cut and blow off a nylon coating deposited on a metal tube without affecting underlying metal.

Additional Patents the Inventor is aware of are U.S. Pat. No. 5,904,461 to Ciniglia et al; and U.S. Pat. No. 4,064,884 to Asp.

Even in view of the prior art, need remains for improved system and methodology for removal of plastic covering from tangled wires and loose coils.

DISCLOSURE OF THE INVENTION

The present invention is a method of removing covering(s) from underlying metal in tangled:
wires,
bundles of wires,
coils of wires, and/or
cables of wires.
It comprises:
a) providing a system for use in removing covering(s) from underlying metal in tangled:
wires,
bundles of wires,
coils of wires, and/or
cables of wires,
comprising:
1) source of pressurized fluid;
2) at least one nozzle for expelling fluid in a jet, and apparatus for adjusting the orientation of said at least one nozzle;
3) a conveyor for securing lengths of tangled: wires, bundle of wires, coil of wires and/or cables of wires which comprise at least one covering and underlying metal, said conveyor being elongated and having a supporting surface comprised of mesh or perforations.

In use fluid provided from said source of pressurized fluid is expelled from said at least one nozzle as a jet and is directed to impinge onto, at an angle-of-incidence thereto, tangled: wires, bundle of wires, coil of wires and/or cables of wires which are present on said supporting mesh or perforated surface of said conveyor, said angle-of-incidence being effected by adjusting the orientation of said at least one nozzle via adjusting said apparatus for adjusting the orientation thereof;

such that impact of said fluid with said at least one covering causes a substantial portion thereof to be stripped from said underlying metal at or near the location at which it impinges onto said tangled: wires, bundle of wires, coil of wires and/or cables of wires.

The method continues with:
b) causing lengths of tangled: wires, bundle of wires, coil of wires and/or cables of wires to be present on said supporting mesh or perforated surface of said conveyor for securing tangled: wires, bundle of wires, coil of wires and/or cables of wires;
c) while causing said length of tangled: wires, bundle of wires, coil of wires and/or cables of wires to be conveyed along said conveyor and/or causing said at least one nozzle to move with respect to said supporting mesh or perforated surface of said conveyor, causing said at least one nozzle to be oriented so that fluid ejected therefrom impinges upon said tangled: wires, bundle of wires, coil of wires and/or cables of wires, and causing fluid to be ejected from said nozzle as a jet;
such that interaction between said ejected fluid and said at least one covering causes a substantial majority thereof to be removed from said underlying metal.

The method can further comprise the step of determining, via experiment, an optimum angle-of-incidence for said at least one nozzle based on effectiveness in removing said at least one covering from said tangled: wires, bundle of wires, coil of wires and/or cables of wires is determined, and causing said at least one nozzle to be oriented at said optimum angleof-incidence by adjusting said apparatus for adjusting the orientation of said at least one nozzle.

The method can involve the tangled wires, bundle of wires, coil of wires and/or cable of wires comprise an outer jacket covering and multiple wire coverings on underlying metal.

The method can involve the tangled wires, bundle of wires, coil of wires and/or cables of wires comprise an outer jacket covering and multiple wires having coverings on underlying metal, said outer jacket and wire coverings being simultaneously removed.

The method can involve said at least one nozzle is attached to a rotatable apparatus such that during use fluid is ejected therefrom along loci which are nominally perpendicular to or at an acute angle to the supporting mesh or perforated surface of said conveyor, while said rotatable apparatus is simultaneously caused to rotate about an axis which is substantially parallel to the locus of the trajectory of the ejected fluid.

The method can involve at least two nozzles being present and in which said nozzles are oriented so as to direct fluid onto said tangled wires, bundle of wires, coil of wires and/or cables of wires present at sequential locations along said supporting mesh or perforated surface of said conveyor.

The method can involve at least two nozzles being present and in which said nozzles are oriented so as to direct fluid onto said tangled wires, bundle of wires, coil of wires and/or cables of wires at sequential locations therealong, at different angles-of-incidence thereto.

The method can involve at least two nozzles being present and in which said nozzles are present at sequential locations therealong, so that they direct the ejected fluid, from angles that are rotated with respect to one another, laterally around said conveyer, including under said mesh or perforated surface. And said method can involve the at least two nozzles being present at the substantially the same location along the length of said conveyor, but are rotated laterally therearound, including under said mesh or perforated surface.

The method can involve said at least two nozzles being present and in which said nozzles are oriented so as to direct fluid onto said tangled wires, bundle of wires, coil of wires and/or cables of wires at an angle-of-incidence to the locus of the length of said conveyor, at between 0.0 and 90 degrees.

The method can involve at least two nozzles being present and in which said nozzles are oriented so as to direct fluid onto said tangled wires, bundle of wires, coil of wires and/or cables of wires at an angle-of-incidence to the locus of the length of said conveyor, at between 0.0 and 90 degrees, and wherein said angle-of-incidence for at least one nozzle is different from that of another thereof.

The method can involve at least two nozzles being present and in which said nozzles are oriented so as to direct fluid onto said tangled wires, bundle of wires, coil of wires and/or cables of wires at an angle-of-incidence to the supporting mesh or perforated surface of said conveyor of 45 degrees.

The method can involve at least two nozzles being present and in which said nozzles are oriented so as to direct fluid onto said tangles: wires, bundle of wires, coil of wires and/or cables of wires at an angle-of-incidence to the supporting mesh or perforated surface of the conveyor of between 1-90 degrees, and/or between 90-179 degrees.

The method can involve at least two nozzles being present and in which said nozzles are oriented so as to direct fluid onto said tangled wires, bundle of wires, coils of wires and/or cables of wires at a relative angle to one another, but at essentially the same location thereof to provide a broadened cross-sectional ejection jet profile.

The method can also involve there being present at least one additional, entry (CB2), conveyor in addition to the primary conveyor (CB1) for securing lengths of tangled wires, bundle of wires, coil of wires and/or cables of wires which comprise at least one covering and underlying metal. Said entry (CB2) conveyor is elongated and having a surface not necessarily comprised of mesh or perforations, said at least one additional, entry (CB2) conveyor serving to sandwich said lengths of tangled wires, bundle of wires, coil of wires and/or cables of wires which comprise at least one covering and underlying metal.

The method can involve said at least one additional, entry, conveyor being oriented at an acute angle to the primary conveyor such that lengths of tangled wires, bundle of wires, coil of wires and/or cables of wires which comprise at least one covering and underlying metal, sandwiched between said primary and entry conveyors are caused to be compressed in a space therebetween. There can also further be present a third conveyor which projects essentially parallel to the primary conveyor, such that a space between said primary and third conveyors receives compressed lengths of tangled wires, bundle of wires, coil of wires and/or cables of wires which comprise at least one covering and underlying metal, from said space between said primary and entry conveyors in use and presents said compressed lengths of tangled wires, bundle of wires, coil of wires and/or cables of wires which comprise at least one covering and underlying metal (CW), in a manner allowing water to be impacted thereupon from said at least one nozzle (SPA/SPA').

The method can also provide that there be scrapers present at ends of the primary and third Conveyor Belts that serve to encorage compressed lengths of tangled wires, bundle of wires, coil of wires and/or cables of wires which comprise at least one covering and underlying metal, from which has been removed at least some covering from underlying metal, to enter a container for collection thereof.

It is noted that a preferred, though not limiting, jet shape is provided by a "fan" shaped nozzle that provides elongated major, and shorter minor axis lengths.

PREVIOUS DISCLOSURE

For additional insight, previously it was presented that a related invention comprises a system for use in removing covering from underlying metal in wires, bundles of wires and cables or the like comprising:
 a) source of pressurized fluid;
 b) at least one nozzle for expelling fluid, and means for adjusting the orientation of said at least one nozzle; and
 c) means for securing a length of wire, bundle of wires or cable or the like which comprises covering and underlying metal.

In use a fluid, (eg. typically a liquid, but which can be a gas, either of which can optionally containing solid particulates and is chosen to meet efficacy and environmental requirements), is expelled from said at least one nozzle and directed to impinge onto said length of wire, bundle of wires or cable or the like at an acute angle, by adjusting the orientation of said at least one nozzle such that impact of said fluid with said covering causes a substantial majority thereof to be stripped from said underlying metal at or near the location at which the fluid impinges onto said length of wire, bundle of wires or cable or the like. When the proper acute, (ie. between 0.0 and 90 or between 180 and 90 degrees with typical applications excluding between 0.0 and 10 or between 180 and 170 degrees and with a demonstrative nominal angle being 45 degrees), angle is achieved between the jet locus and the wire, the fluid jet causes a wedging action between a coating and underlying metal. A plurality of nozzles can be oriented so as to simultaneously direct fluid onto said wire, bundle of wires or cable or the like. Importantly, at least one fluid jet is caused to be of an elongated "fan" shape. The nozzles can be positioned to direct fluid jets onto said wire, bundle of wires or cable or the like at the same location or at sequential locations along a length thereof, at the same or different locations around the circumference thereof, and the angle-of-incidence for each jet can be the same or different angles-of-incidence for different nozzles can be used.

A method of removing covering from underlying metal in wires, bundles of wires and cables or the like comprises:

a) providing a system for use in removing covering from underlying metal in wires, bundles of wires and cables or the like as described above:

b) causing a length of wire, bundle of wires or cable or the like to be secured in said means for securing a length of wire, bundle of wires or cable or the like in a manner which allows it to be slid therethrough;

c) while causing said length of wire, bundle of wires or cable or the like to be slid through said means for securing a length of wire, bundle of wires or cable or the like, causing said at least one nozzle to be oriented so that fluid ejected therefrom impinges upon said length of wire, bundle of wires or cable or the like, and causing fluid to be ejected from said nozzle;

such that interaction between said ejected fluid and said covering causes a substantial majority thereof to be removed from said underlying metal.

An additional step can involve determining, via experiment, an optimum angle-of-incidence for at least one nozzle jet based on effectiveness in removing said covering from said length of wire, bundle of wires or cable or the like is determined, and causing said at least one nozzle to be oriented at said optimum angle-of-incidence by adjusting said means for adjusting the orientation of said at least one nozzle.

The length of wire, bundle of wires or cable or the like can comprise a covering on an underlying metal comprised of one wire, or a plurality of wires, each of which has a covering.

A single nozzle can be used, or least two nozzles can be present. Where at least two nozzles are present and where said nozzles are oriented to so as to direct fluid onto said wire, bundle of wires or cable or the like, they can be positioned to provide jets at the same or at sequential locations along said length of a wire, bundle of wires or cable or the like, and at the same or at different locations around the circumference thereof.

One or more nozzles can be oriented so as to direct fluid onto said wire, bundle of wires or cable at an angle-of-incidence to the locus of the length thereof, at between zero and 90 degrees, which can be, but is not necessarily nominally 45 degrees. Where more than one nozzle is present the angle-of-incidence for at least one nozzle can be different from that of another thereof. Preferably the angle-of-incidence to the locus of the length thereof is between 1-10 and 90 degrees, or between 90 and 170-179 degrees, where 1-10 and 170-179 indicates that said ranges are not preferred, but use thereof is within the scope of the described invention.

At least two nozzles can be present and oriented so as to direct fluid onto said wire, bundle of wires or cable at a relative angle to one another to provide a broadened cross-sectional ejection profile.

Also, while not preferred at least two nozzles can be attached to a rotatable means such that during use fluid is ejected from at least two of said nozzles along a locus which is substantially perpendicular to the locus of the length of said wire, or at an acute angle to said bundle of wires or cable or the like, while said rotatable means is simultaneously caused to rotate about an axis which is also substantially perpendicular to the locus of the length of said wire, bundle of wires or cable or the like.

It is disclosed that an initial prototype system was a demonstrative 4000 psi washer. A second system was constructed to test the invention, and comprised a barrel over the top of which was extended a length of wire, bundle of wires or cable or the like which comprises a covering and underlying metal. Two reels were present to provide and re-wind said length of wire, bundle of wires or cable or the like which were passed over the top of the barrel at a rate which was on the order of 60 ft./min. Said rate is demonstrative and not a limitation. A nozzle provided pressurized fluid from a source thereof, which was a demonstrative 20,000 psi diesel pump source which served to provide high pressure fluid. Exemplary details of a suitable nozzle is one that provides a fan shaped flow of fluid at an angle-of-incidence (AOI) to an exemplary wire. The fan jet was 0.005-0.007 inch wide, which is to be understood as exemplary and not limiting. Said prototype systems were configured at the University of Missouri for use in testing the concept of the described invention.

Further, typical practice provides that nozzles are oriented to eject fluid at different locations around the circumference of said length of wire, bundle of wires or cable or the like. That is, for instance, one nozzle might be oriented to eject fluid from a side, and the other downward from the top or upward from the bottom etc. As mentioned above, another configuration provides that at least two nozzles are present and that said nozzles are oriented so as to direct fluid onto said wire, bundle of wires or cable at a relative angle to one another to provide a broadened cross-sectional ejection profile, (ie. a fan-shaped jet). The preferred fluid jet is of an elongated shape, (ie. it has a longer major and shorter minor axis in cross-section).

This can result from the combining the output of two nozzles oriented to eject fluid along loci which were separated by 25 degrees, however, any approach to providing a fluid ejection of an elongated shape is to be considered equivalent and within this invention's scope. It is further to be understood that additional nozzles can also be added in any functional configuration.

In one test of the prototype system the nozzle was offset from the a cable by 0.5 inch, and the nozzle ejected fluid at 15K PSI while the cable was pulled through the ejected fluid at 60 ft/min. Upwards of 99% of the covering was shown to be removed from the underlying metal by said process. Further, as mentioned, it is to be understood that success in removal of coverings is related to the angle-of-incidence the fluid jet makes with respect to the length of wire, bundle of wires or cable or the like, and, it is noted that a plurality of fluid jets can be oriented at offset angles with respect to one another so that fluid approaches many locations around the circumference of the length of wire, bundle of wires or cable or the like. The angle-of-incidence is important as when it is appropriate it causes a "wedging" action between the underlying wire and the coating being removed, and use of a fan-shaped jet at the wedging angle provides further benefit. Again, the ejected fluid is preferably of a fan shape, and optimum application thereof provides that the plane of the elongated shape approach the length of wire, bundle of wires or cable or the like which comprises a covering and underlying metal at an optimum angle-of-incidence (AOI). The system of the described invention then provides for adjusting the (AOI) to allow experimental determination of an optimum (AOI). It is disclosed that the fluid can be of any flowable composition, with the preference being liquid which remains so throughout the procedure. Specifically water is disclosed as the preferred liquid fluid. The fluid can be at any functional temperature, with a limitation being based in safety concerns, such as damage to materials, which might pose a health threat. A specific non-liquid fluid possibility includes dry-ice crystals.

It is also disclosed that the described invention can be applied to other than length of wire, bundle of wires or cable or the like which comprises a covering and underlying metal, such as electronic parts, (eg. from old computers and other electronic equipment), and old tires. That is, any item which is composed of different layers of different hardness can be separated by streams of fluids where the appropriate pressure, angle-of-incidence, nozzle design etc. are applied.

It is noted that where a cable has an outer jacket which surrounds a plurality of wires that each have a separate coating, different jet shapes and pressures of application can be utilized. For instance, the fluid jet can be ejected onto a bundle of wires at about 10K PSI to remove an outer jacket and the wires can be processed using a fluid jet ejected at 20K PSI.

Where a tangle of tangled mass is to be processed, multiple nozzles can be present and caused to eject fluid along a locus which was substantially perpendicular to plane in which is the tangle of wire, while a rotatable means to which they are attached is simultaneously caused to rotate about an axis which is also substantially perpendicular to the tangled mass. Note, while the tangled mass is not oriented in an elongated manner per se., it is to be considered to be a length of wire, bundle of wires or cable or the like which comprises a covering and underlying metal, for the purposes of Claim interpretation.

The invention will be better understood by reference to the Detailed Description of this Specification, in conjunction with the Drawings.

BRIEF DESCRIPTION OF THE DRAWINGS

FIGS. 2, 3, 4a1, 4a2, 4b and 4c demonstrate a more detailed system for practicing a related invention.

FIGS. 5a-5e demonstrate variations on the general theme of applying fan jet nozzles.

DETAILED DESCRIPTION

Figure 1:
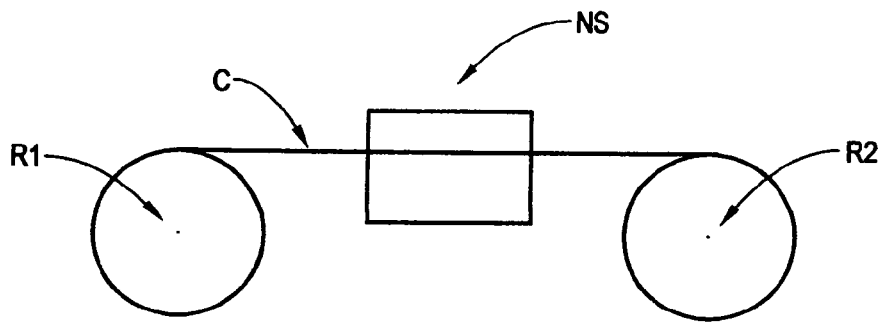
FIG. 1, there is shown a demonstrative system for practicing a related invention.
Figure 7:
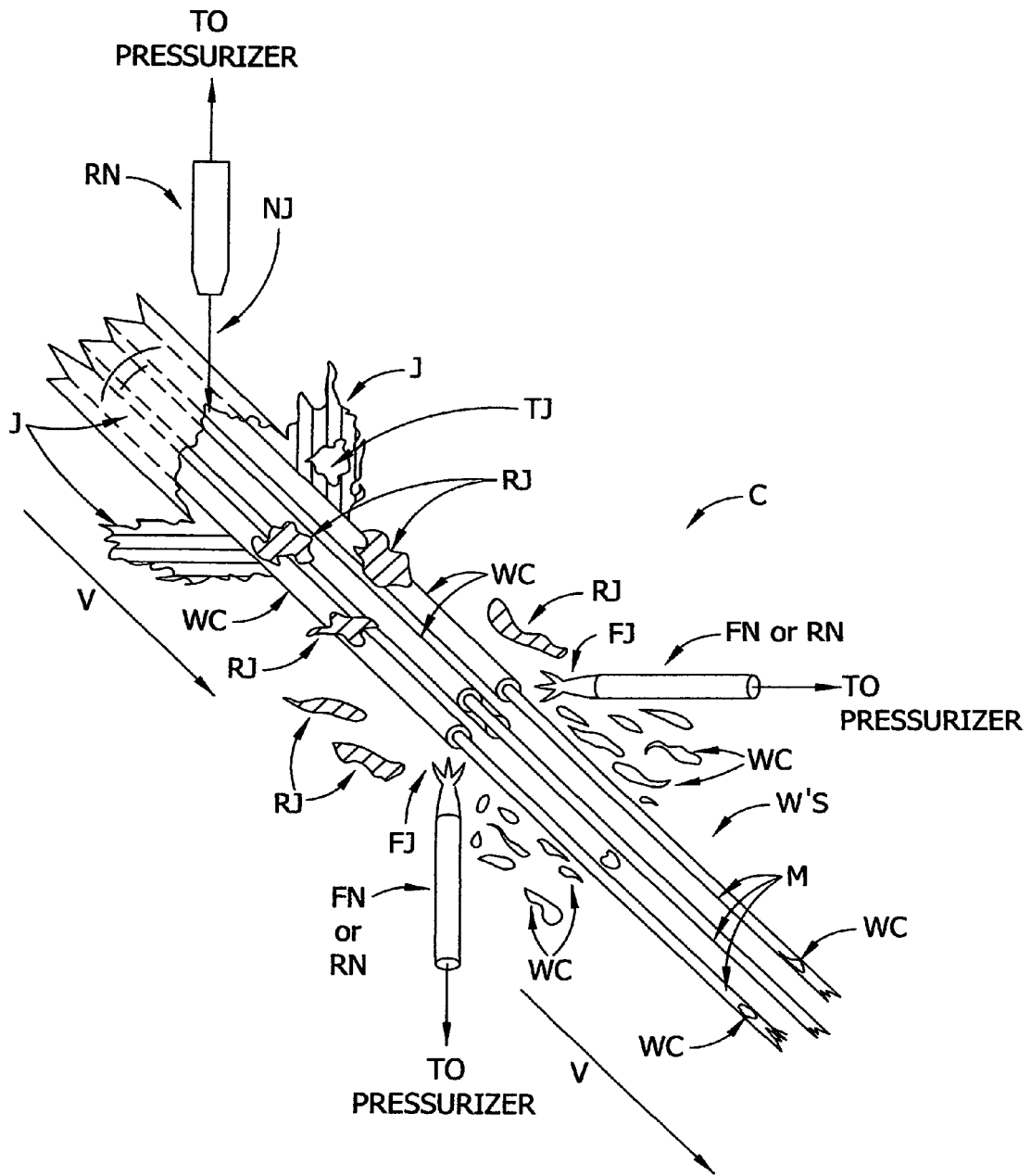

Turning now to FIG. 1, and continuing to FIG. 7, there is shown a demonstrative system for practicing a related invention as previously disclosed in Parent Applications. Shown are a first source reel (R1) for providing a length of wire, bundle of wires or cable or the like which comprises a covering and underlying metal, and a second take-up reel (R2) separated by a region in which is positioned a nozzle system (NS).

Figure 2:
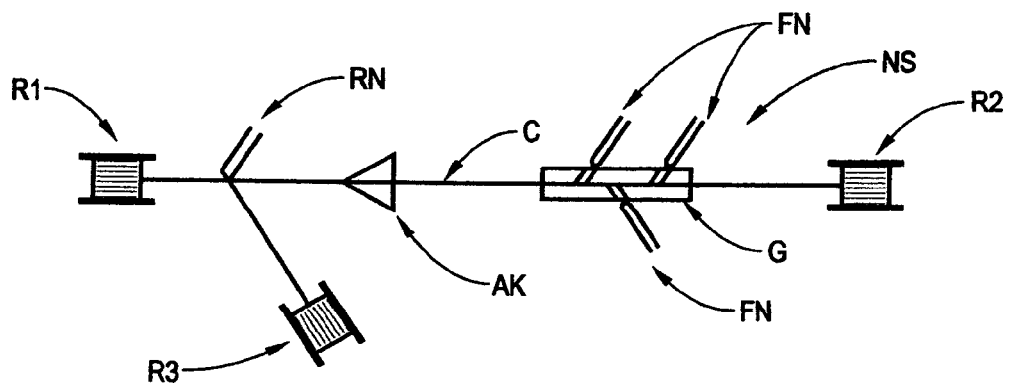
Figure 3:
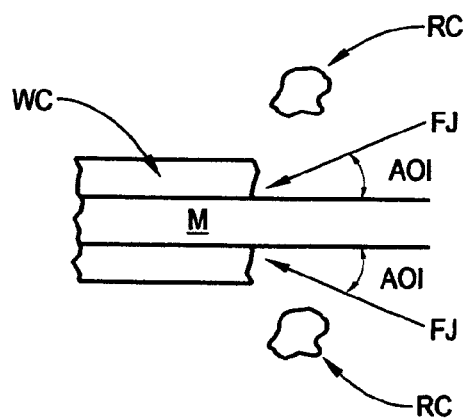
Figure 4B:
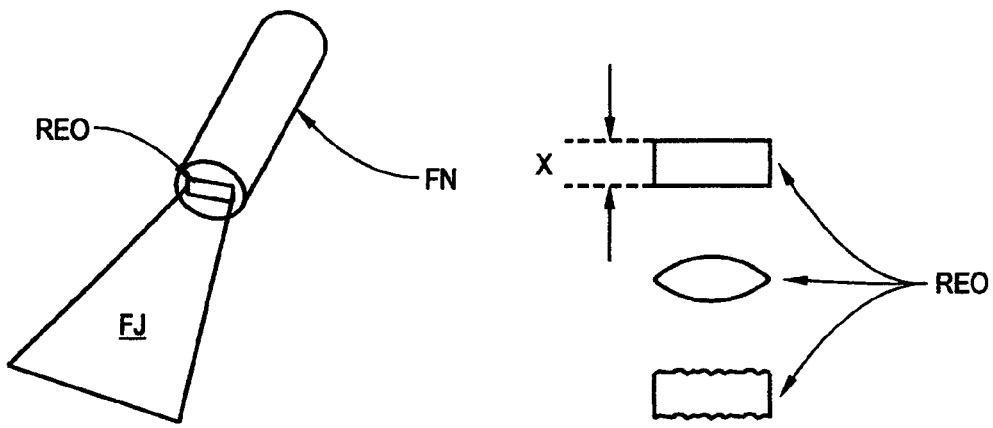
Figure 4B:
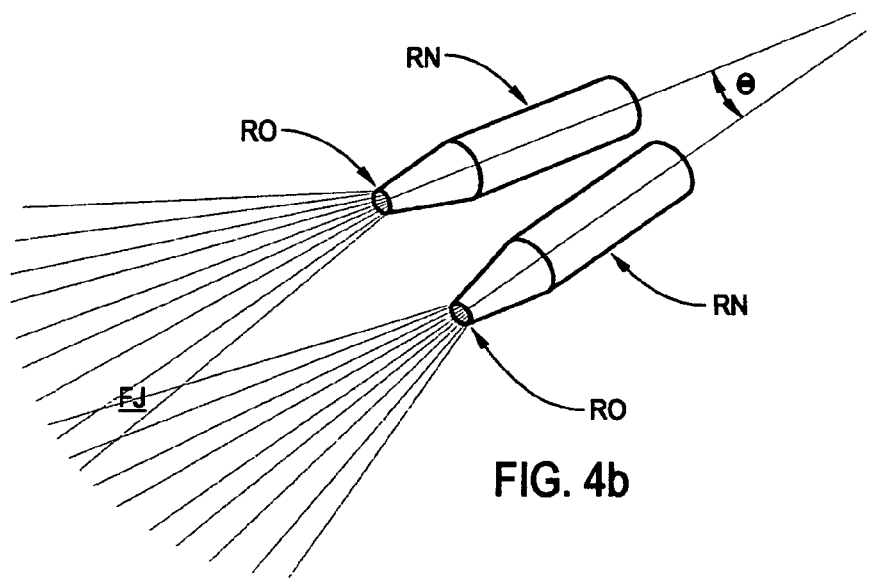
Figure 4C:
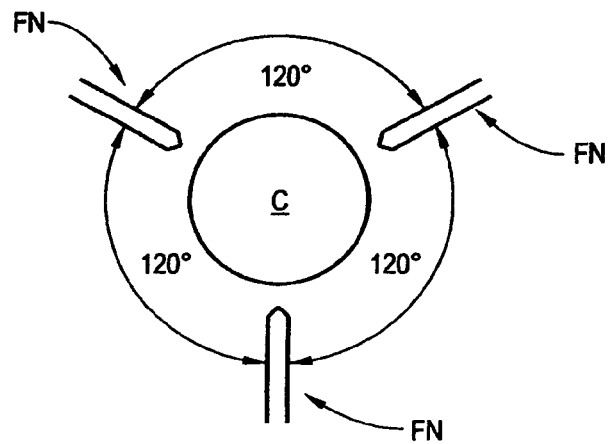

FIGS. 2, 3, 4a1, 4a2, 4b and 4c demonstrate a more detailed system for practicing a related invention. Shown again in FIG. 2 are the first source reel (R1) for providing a length of wire, bundle of wires or cable or the like (C) which comprises a covering (WC) and underlying metal (M), and a second take-up reel (R2) separated by a region, in which is positioned a nozzle system (NS). Also shown are a round nozzle (RN) for slitting a PVC jacket, and a third reel (R3) for accumulating removed PVC. Also indicated is an air knife (AK) or conical shaver to remove remaining PVC jacket. Further indicated is a guide (G) for positioning the length of wire, bundle of wires or cable or the like therewithin, and for allowing fan nozzles (FN) to provide a fan shaped fluid jet (FJ) thereto via openings in said guide (G). FIG. 4c indicates that the fan jets can be oriented at 120 degrees with respect to one another around the circumference of the length of wire, bundle of wires or cable or the like. Note also that, as shown in FIG. 3, the angle-of-incidence (AOI) at which a fluid jet (FJ) approaches the length of wire, bundle of wires or cable or the like (C) is acute, and serves to remove a coating (WC) thereon as removed coating (RC) from underlying metal (M) by a wedging action. FIGS. 4a1 and 4b show approaches to forming a fan jet (FJ). FIG. 4a1 shows a fan nozzle (FN) which comprises a rectangular shaped nozzle outlet (REO), and FIG. 4b shows two round nozzles (RN) with non-rectangular, (eg. round) outlets (RO).

It is to be appreciated that the related invention is found primarily in the use of fan jets (FN) as demonstrated in FIGS. 4a1 and 4b, which are applied to at acute angles-of-incidence (AOI) to a length of wire, bundle of wires or cable or the like (C) to remove a coating (WC) from an underlying metal (M). FIG. 4a2 shows that the rectangular shaped nozzle outlet (REO) can be of various generally rectangular shapes. Note that a typical non-limiting width "x" in FIG. 4a2 can be between 0.005-0.007 inch. It is mentioned that FIG. 2 identifies a guide (G) as present, but it need not be used, as generally indicated in FIG. 3. It is also noted that a typical non-limiting offset of a fan nozzle (FN) from the coating (WC) length of wire, bundle of wires or cable or the like (C) is about 0.5 inch.

Figure 5D:
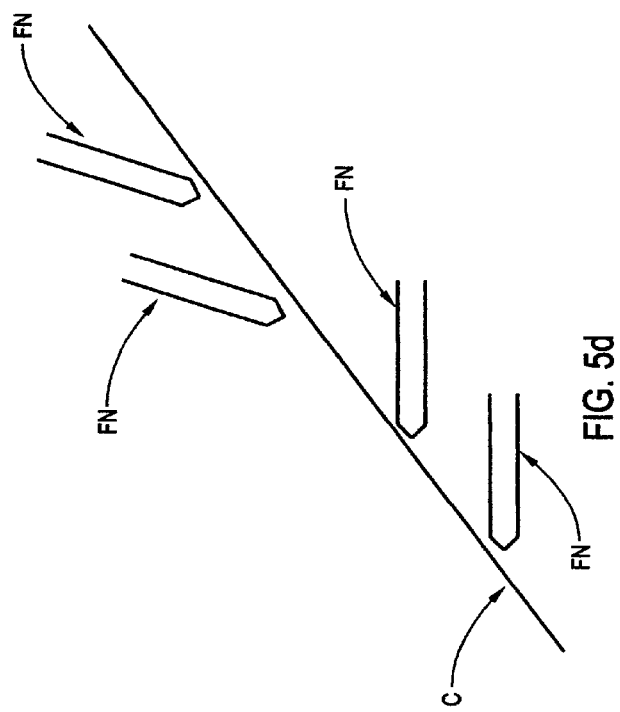
Figure 5C:
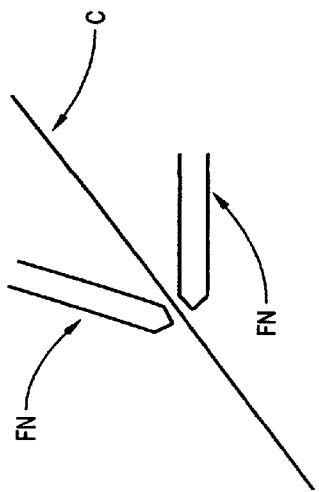
Figure 5E:
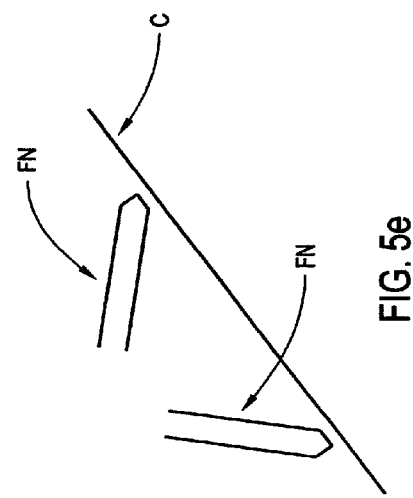

As alluded to, the focus of the related invention is in the application of fan jets (FJ) of fluid, applied at acute angles to a length of wire, bundle of wires or cable or the like (C) to remove a coating (WC) thereon from an underlying metal (M). FIGS. 5a-5d demonstrate variations on the general theme of applying fan jet nozzles. FIGS. 5a and 5b show a plurality of fan nozzles sequentially and simultaneously, respectively, positioned along a length of wire, bundle of wires or cable or the like (C). Said fan nozzles (FN) are shown oriented at near 90 degrees to said length of wire, bundle of wires or cable or the like (C), but it should be understood that any acute angle-of-incidence is implied thereby as generally indicated by FIGS. 5c and 5d. Also note that FIG. 5e demonstrates that a fan nozzle can be oriented at an acute angle between 180-90 degrees as well as between 0.0-90 degrees.

It is noted that applying the process of the related invention to a length of wire, bundle of wires or cable or the like which comprises a covering and underlying metal (C) using a fluid jet (FJ) of an elongated shape, (ie. it has a longer major and shorter minor axis in cross-section which is the result of combining the output of two nozzles oriented to eject fluid along loci which were separated by 25 degrees), wherein the fan nozzle (FN) was offset from the (C) by 0.5 inch, and the nozzle ejected fluid at 15K PSI while the (C) was pulled through the ejected fluid at 60 ft/min, resulted in upwards of 99% of the covering being removed from the underlying metal by the process in testing. It is noted that any approach to providing a fluid ejection of an elongated shape is to be considered equivalent and within this invention's scope. Further, it is again noted that success in removal of coverings is related to the angle-of-incidence (AOI) the fluid jet makes with respect to the length of wire, bundle of wires or cable or the like (C), and, it is noted that a plurality of fluid jets can be oriented at rotated angles with respect to one another so that fluid approaches many locations on the circumference of thereof. The angle-of-incidence (AOI) is important as when it is appropriate it causes a "wedging" action between the underlying wire and the coating being removed.

Figure 6:
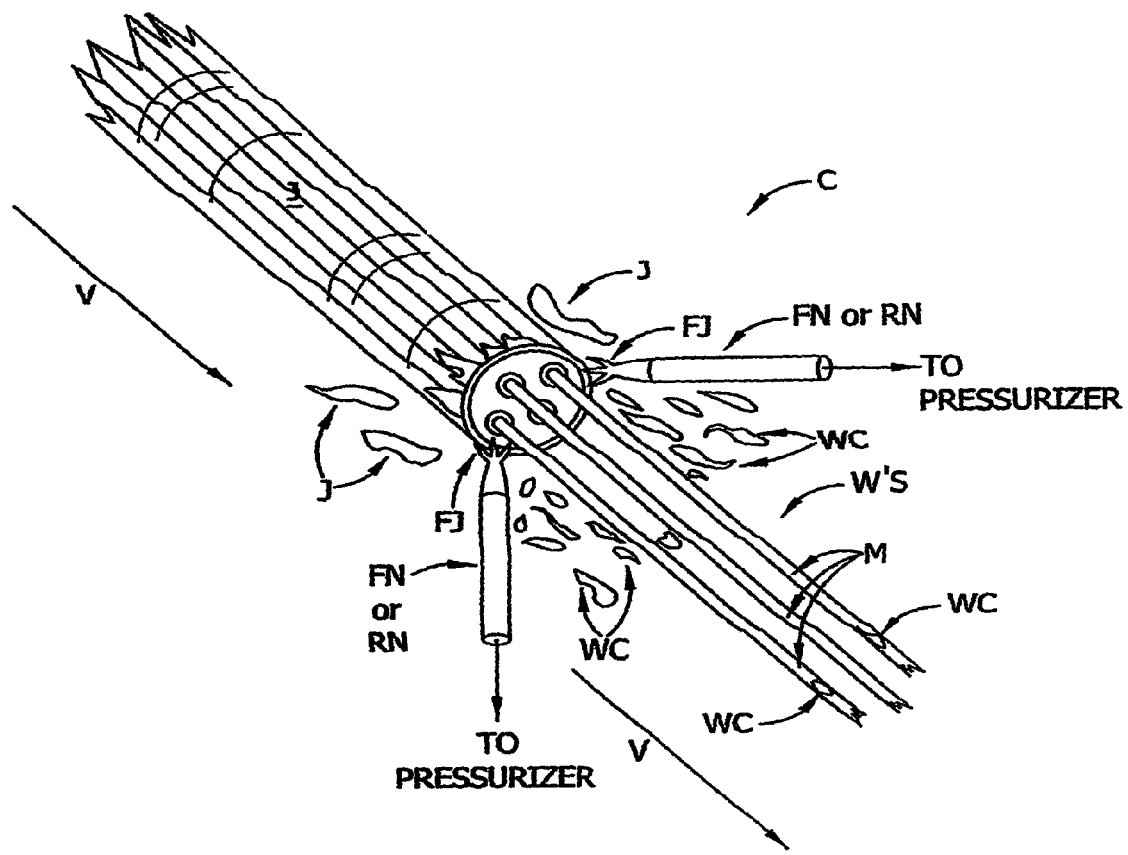
FIGS. 6 and 7 show fluid Jets removing Cable Jacket and Wire Covering material from a wire cable.

FIGS. 6 and 7 show fluid Jets removing Cable Jacket and Wire Covering material from a wire cable.

Figure 8:
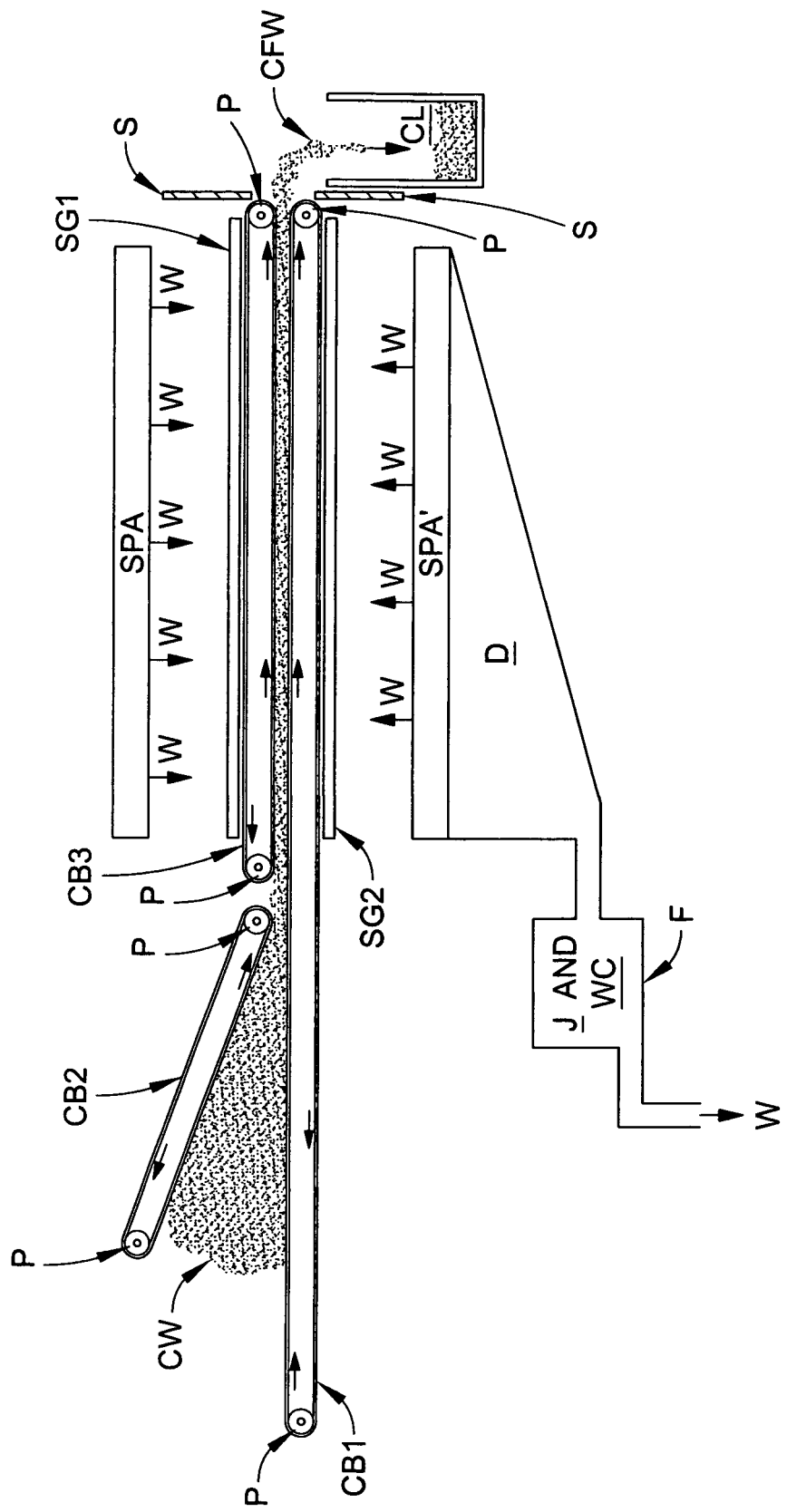
FIG. 8 shows a waterjet system for removing coverings from tangled wires and loose coils.

FIGS. 1-7 then present a system for providing and using a fan-shaped liquid jet which is caused to be oriented at an acute angle-of-incidence, (which can be experimentally determined and implemented in use), to the locus of length of wire, bundle of wires or cable or the like, so that a wedging action effects removal of one or more coverings from underlying metal. While FIGS. 1-7 used an elongated Cable (C) as an example, the same basic principles apply to the use of water jets when tangled wires and loose coils, (which is to be interpreted to include wires, bundle of wires, coil of wires and/or cables of wires which comprise at least one covering and underlying metal cable and/or electronic components which comprise a covering), are to be processed. In the case of tangled wires and loose coils however, an alternative system is preferable. FIG. 8 and those following thereafter show a demonstrative system for use in a Method of removing coverings from such tangled and loose coils and the like which do not present in a form which is more easily handled, such as the elongated cable example disclosed in FIGS. 1-7.

FIG. 8 shows a present invention waterjet system for removing coverings from tangled wires and loose coils, (which is to be interpreted to include wires, bundle of wires, coil of wires and/or cables of wires which comprise at least one covering and underlying metal cable and/or electronic components which comprise a covering). Shown are a Primary Conveyor belt (CB1), an Entry Conveyor Belt (CB2) and a third Conveyor Belt (CB3) which, in use, act in conjunction to force tangled and loosely coiled Covered Wires (CW) from the left to right in the Figure. Note that Pulleys (P) are shown that direct the various Conveyor Belts (CB1) (CB2) (CB3) to move in a circulating manner. (It is to be understood that Conveyor Belts (CB2) and (CB3) could be fashioned into a single Conveyor Belt and such is to be understood to be within the scope of the present invention).

In use a fork lift, for instance, provides a mass of tangled and loosely coiled Covered Wires (CW) atop Primary Conveyor Belt (CB1) at the left the thereof as shown, and said Primary Conveyor Belt (CB1) causes said mass to move between it and said Entry Conveyor Belt (CB2) which serves to compress said mass between said Primary and Entry Conveyor Belts (CB1) (CB2). As indicated, said mass of tangled and loosely coiled Covered Wires (CW) are caused to move along to the right in FIG. 8, sandwiched between said Primary and Entry Conveyor Belts (CB1) (CB2), and then continue along sandwiched between Primary and Third Conveyor Belts (CB1) (CB3). Note that there are Sprayer Gates (SG1) (SG2) above and below the sequence of Primary Conveyor (CB1), mass of tangled and loosely coiled Covered Wires (CW) and third Conveyor Belt (CB3), which are flanked by Spraying Systems (SPA). FIGS. 9a-9d show various possible designs for each Sprayer Gate. Note also that there are shown Scrapers (S) at the ends of the Primary and Third Conveyor Belts (CB1) (CB2). In use said Scrapers (S) serve to influence tangled and loosely coiled wires moving out from between the Conveyor Belt (CB1) (CB2) system to fall into the Collector (CL) as tangled and loosely coiled essentially Cover-Free-Wires (CFW), from which the coverings were removed, and wherein it can be compressed into bales.

Figure 9A:
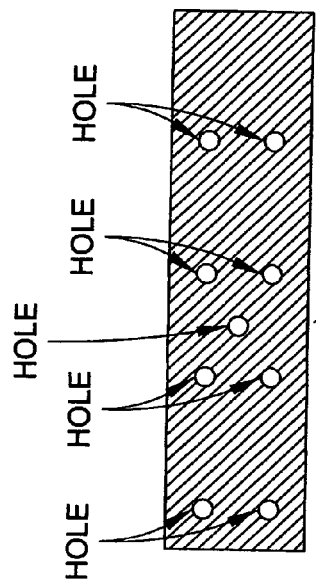
FIGS. 9a-9e show various spray gate components for the system of FIG. 8.
Figure 9B:
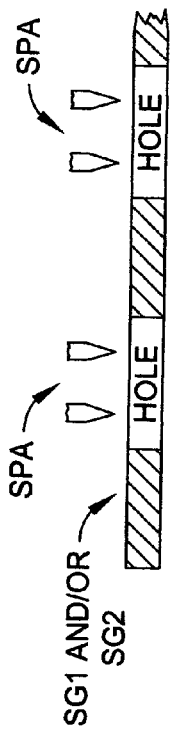
Figure 9C:
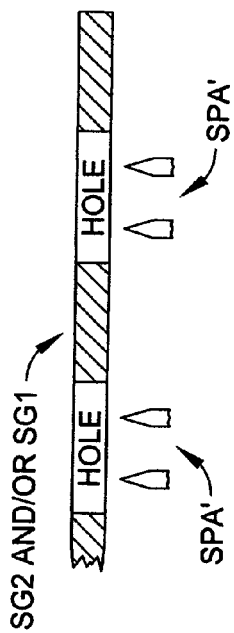
Figure 9D:
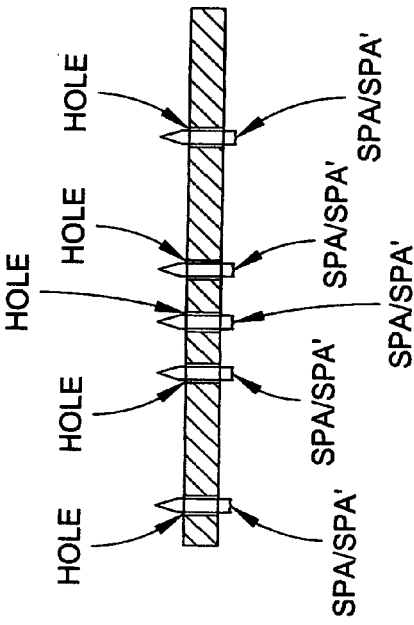
Figure 9E:
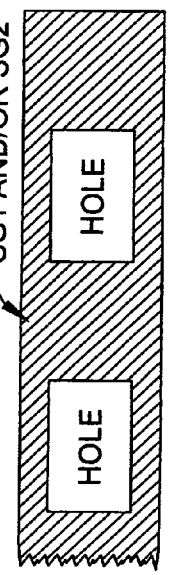

As alluded to, FIGS. 9a-9d show side views for various sprayer gate components as identified the system of FIG. 8. Note that where Sprayer Gate (SG1) or (SG2) is selected to be the design shown in FIG. 9a then Sprayer Gate (SG2) (SG1), respectively, is typically selected to be that shown in FIG. 9b. This provides a staggered pattern as to where water from Water Sprayer Nozzle (SPA) (SPA') can pass through said (SG1) and SG2) from above and below in FIG. 8. This is best appreciated by comparing FIGS. 9a and 9b. FIG. 9c shows a top view of the Sprayer Gate (SG2) in FIG. 9b. FIGS. 9d and 9e show side and top views, respectively, of an alternative design for Sprayer Gate (SG1) or (SG2). Note that when used, the FIGS. 9d and 9e design can involve the Water Sprayer Nozzle (SPA) (SPA') projecting through the Holes shown in said FIGS. 9d and 9e. In use said Sprayer Nozzles (SPA) (SPA') can be caused to rotate to provide a water jet that approaches coatings on mass of tangled and loosely coiled Covered Wires (CW) being processed.

It is to be understood that coverings from tangled and loosely coiled Covered Wires (CW), (eg. tangled wires, bundle of wires, coil of wires and/or cables of wires), will, in use, exit in the space between the FIG. 8 Sprayer Nozzle (SPA) and Sprayer Gate (SG1), and between the space between Sprayer Nozzle (SPA') and Sprayer Gate (SP2), much as in shown for water jet removed coverings in FIGS. 6 and 7 herein. To avoid clutter this is not shown in FIG. 8, however, for purposes of understanding, removed (J) and (WC) in FIGS. 6 and 7 should be visualized as being presented, by waterjet action, in the identified spaces between Sprayer Nozzle (SPA) and Sprayer Gate (SG1), and between the space between Sprayer Nozzle (SPA') and Sprayer Gate (SP2), when the system of FIG. 8 is used. It is noted that said equivalent (J) and (WC) pass through Primary and Third Conveyor (CB1) (CB3) mesh or perforations to be ejected into said identified spaces.

Figure 10A:
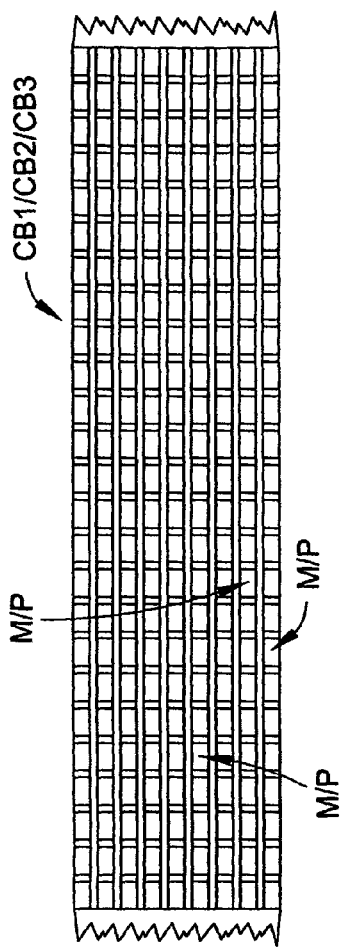
FIGS. 10a and 10b show two approaches to conveyor belt construction.
Figure 10B:
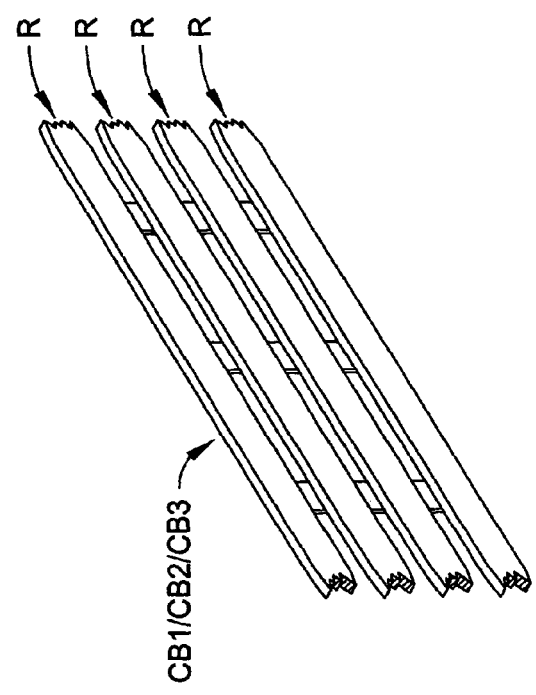

It is also noted that FIGS. 10a and 10b shows two possible designs for each of the Primary, Entry and Third Conveyor Belts (CB1) (CB2) (CB3). In FIG. 10a there is shown a Mesh or Perforated pattern, where Mesh implies a multiplicity of square, rectangular or other shape openings of a size determined to be appropriate to both support and effect transport of a mass of tangled and loosely coiled Covered Wires (CW), and allow water from Water Sprayer Nozzles (SPA) (SPA') to pass therethrough and effectively impact coverings on said mass of tangled and loosely coiled Covered Wires (CW). FIG. 10b shows an elongated "rib" design. (Note, because water need not pass through it, second Conveyor (CB2) need not be of the mesh or perforated design).

It is noted that a preferred, though not limiting, jet shape is provided by a "fan" shaped nozzle (SPA/SPA') that provides elongated major and shorter minor axis lengths.

Also, it is to be understood that Second (CB2) and Third (CB3) Conveyors can be combined into a single belt identified as (CB3). This would involve additional pulleys present where the angled Second and Third Conveyors would merge. Additional pulleys can also be placed along the lengths of each of (CB1) (CB2) and (CB3).

It is also noted FIG. 8 shows that, as a practical matter, a Drain (D) is typically present under Sprayer Nozzles (SPA') to catch exiting Water (W) combined with removed Wire Coverings (WC) and cable Jackets (J), (which (WC) and (J) are often simultaneously removed by practice of the present invention). A Filter (F) is also shown, which in use serves to accumulate said removed Wire Coverings (WC) and cable Jackets (J), and which allows Water (W) to then exit. Further, a "mist" is formed during use of the present invention, and as a practical matter, it is preferred practice to provide a means to contain it, which can be a hood that at least partially circumscribes the FIG. 8 system, (not shown).

Finally, the terminology "fluid" refers to water, although where not in contradiction to Patentability, could refer to a liquid or gas which, while possibly containing solid particulates, remains in a liquid or gaseous state throughout its use in the invention.

Please noted that to make the Claims read a bit easier, at the Examiner's suggestion during prosecution the word "substrate" has been adopted therein to refer to:
wires,
bundles of wires,
coils of wires, and/or
cables of wires.
The word "Substrate" is to be interpreted to include any or all of the listed examples. The Claims are to be read with the word "substrate" so defined. Further, it is to be understood that Primary Conveyor Belt and Primary Entry Conveyor Belt both refer to Conveyor Belt (CB1).

Having hereby disclosed the subject matter of the present invention, it should be obvious that many modifications, substitutions, and variations of the present invention are possible in view of the teachings. It is therefor to be understood that the invention may be practiced other than as specifically described, and should be limited in its breadth and scope only by the Claims.

I claim:

1. A method of removing covering(s) from underlying metal in a substrate consisting of tangled:
    wires,
    bundles of wires,
    coils of wires, and/or
    cables of wires,
comprising:
    a) providing a system for use in removing covering(s) from underlying metal in said substrate:
comprising:
    a source of pressurized fluid;
    at least one nozzle for expelling fluid in a jet, and apparatus for adjusting the orientation of said at least one nozzle;
    a primary entry conveyor (CB1) for securing lengths of substrate which comprise at least one covering and underlying metal, said primary entry conveyor being elongated and having a supporting surface comprised of mesh or perforations;
    said system further comprising at least one additional, entry (CB2) conveyor in addition to the primary entry conveyor (CB1) for securing lengths of substrate, said additional entry (CB2) conveyor being elongated and positioned such that it serves to sandwich said lengths of substrate between it and said primary entry conveyor (CB1);
such that in use fluid provided from said source of said pressurized fluid is expelled from said at least one nozzle as a jet and is directed to impinge onto, at an angle-of-incidence thereto, said substrate which is present on said supporting surface comprising the supporting mesh or perforations of said primary entry conveyor (CB1), said angle-of-incidence being effected by adjusting the orientation of said at least one nozzle via adjusting said apparatus for adjusting the orientation thereof; and
such that impact of said fluid with said at least one covering causes a substantial portion thereof to be stripped from said underlying metal at or near the location at which it impinges onto said substrate;
    b) causing lengths of substrate to be present on said supporting surface comprising the supporting mesh or perforations of said primary entry conveyor (CB1) for securing substrate;
    c) while causing said length of substrate to be conveyed along said primary entry conveyor and/or causing said at least one nozzle to move with respect to said supporting surface comprising the mesh or perforations of said primary entry conveyor, causing said at least one nozzle to be oriented so that fluid ejected therefrom impinges upon said substrate and causing fluid to be ejected from said at least one nozzle as a jet;
such that interaction between said ejected fluid and said at least one covering causes a substantial majority thereof to be removed from said underlying metal in said substrate.

2. A method as in claim 1, in which the substrate comprises an outer jacket covering and multiple wire coverings on underlying metal.

3. A method as in claim 1, in which the substrate comprises an outer jacket covering and multiple wires having coverings on underlying metal, said outer jacket and wire coverings being simultaneously removed.

4. A method as in claim 1, in which said at least one nozzle is attached to a rotatable apparatus such that during use fluid is ejected therefrom along loci which are nominally perpendicular to or at an acute angle to the supporting surface comprising the supporting mesh or perforations of said primary entry conveyor (CB1), while said rotatable apparatus is simultaneously caused to rotate about an axis which is substantially parallel to the locus of the trajectory of the ejected fluid.

5. A method as in claim 1, in which at least two nozzles are present and in which said nozzles are oriented so as to direct fluid onto said substrate present at sequential locations along said supporting surface comprising the supporting mesh or perforations of said primary entry conveyor (CB1).

6. A method as in claim 1, in which at least two nozzles are present and in which said nozzles are oriented so as to direct fluid onto said therealong, at different angles-of-incidence thereto.

7. A method as in claim 1, in which at least two nozzles are present and in which said nozzles are present at sequential locations so that they direct the ejected fluid from angles that are rotated with respect to one another, laterally around said primary entry conveyor (CB1), including under said supporting surface comprising the mesh or perforations thereof.

8. A method as in claim 1, in which at least two nozzles are present and in which said nozzles are present at the substantially the same location along the length of said primary entry conveyor (CB1), but are rotated laterally therearound, including under said supporting surface comprising the mesh or perforations thereof.

9. A method as in claim 1, in which at least two nozzles are present and in which said nozzles are oriented so as to direct fluid onto said substrate at an angle-of-incidence to the locus of the length of said primary entry conveyor (CB1) at between 0.0 and 90 degrees.

10. A method as in claim 1, in which at least two nozzles are present and in which said nozzles are oriented so as to direct fluid onto said substrate at an angle-of-incidence to the locus of the length of said primary entry conveyor (CB1), at between 0.0 and 90 degrees, and wherein said angle-of-incidence for at least one nozzle is different from that of another thereof.

11. A method as in claim 1, in which at least two nozzles are present and in which said nozzles are oriented so as to direct fluid onto said substrate at an angle-of-incidence to the supporting surface thereof comprising the mesh or perforations of said primary entry conveyor (CB1) of 45 degrees.

12. A method as in claim 1, in which at least two nozzles are present and in which said nozzles are oriented so as to direct fluid onto said substrate at an angle-of-incidence to the supporting surface thereof comprising the mesh or perforations of the primary entry conveyor (CB1) of between 1-90 degrees, and/or between 90-179 degrees.

13. A method as in claim 1, in which at least two nozzles are present and in which said nozzles are oriented so as to direct fluid onto said substrate at a relative angle to one another, but at essentially the same location thereof to provide a broadened cross-sectional ejection jet profile.

14. A method as in claim 1 in which said at least one additional entry conveyor (CB3) is oriented at an acute angle to the primary conveyor (CB1) such that substrate which comprises at least one covering and underlying metal sandwiched between said primary entry and additional entry conveyors, are caused to be compressed in a space therebetween.

15. A method as in claim 1 in which there is further present a third conveyor (CB3) which projects essentially parallel to the primary entry conveyor (CB1), such that a space between said primary entry (CB1) and third (CB3) conveyors receives compressed lengths of substrate which comprise at least one covering and underlying metal, from said space between said primary entry (CB1) and additional entry (CB3) conveyor in use, and presents said compressed substrate which comprises at least one covering and underlying metal (CW), in a manner that allows water to be impacted thereupon from said at least one nozzle (SPA/SPA').

16. A method as in claim 15, in which scrapers (S) are present at ends of the primary entry (CB1) and third (CB3) Conveyors that serve to encourage compressed substrate, at least some of which comprise wire and jacket coverings and underlying metal (CW) from which has been simultaneously removed at least some jacket and wire covering from underlying metal, to enter a container (CL) for collection thereof.

17. A method as in claim 1 in which the jet is provided by a "fan" shaped nozzle that provides that said jet has elongated major and shorter minor axis lengths.

18. A system for removing covering(s) from underlying metal in a substrate consisting of tangled:
   wires,
   bundles of wires,
   coils of wires, and/or
   cables of wires,
comprising:
   source of pressurized fluid;
   at least one nozzle for expelling fluid in a jet, and apparatus for adjusting the orientation of said at least one nozzle;
   a primary entry conveyor (CB1) for securing lengths of substrate which comprise at least one covering and underlying metal, said primary entry conveyor being elongated and having a supporting surface comprised of mesh or perforations;
   said system further comprising an additional entry (CB2) conveyor in addition to the primary entry conveyor (CB1) for securing lengths of substrate which comprises at least one covering and underlying metal, said additional entry (CB2) conveyor being elongated and having a surface; said additional entry conveyor being oriented at an acute angle to the primary entry conveyor such that lengths of substrate which comprise at least one covering and underlying metal, are sandwiched between said primary (CB1) and additional (CB2) entry conveyors and are caused to be compressed in a space therebetween;
   said system further comprising a third conveyor (CB3) which projects essentially parallel to the primary entry conveyor (CB1), such that a space between said primary entry (CB1) and third (CB3) conveyors receives compressed lengths of substrate which comprise at least one covering and underlying metal from said space between said primary entry (CB1) and additional entry (CB2) conveyors in use, and presents said compressed lengths of substrate which comprise at least one covering and underlying metal (CW), in a manner allowing water to be impacted thereupon from said at least one nozzle (SPA/SPA');
   said system also comprising scrapers (S) present at ends of the primary entry and third conveyor Belts (CB1) (CB3) that serve to encorage compressed lengths of substrate which comprise at least one covering and underlying metal (CW), from which has been removed at least some covering from underlying metal, to enter a container (CL) for collection thereof;
such that in use fluid provided from said source of pressurized fluid is expelled from said at least one nozzle as a jet and is directed to impinge onto, at an angle-of-incidence thereto, substrate which is present on said supporting surface comprising the mesh or perforations of said primary entry conveyor, said angle-of-incidence being effected by adjusting the orientation of said at least one nozzle via adjusting said apparatus for adjusting the orientation thereof;
such that impact of said fluid with said at least one covering causes a substantial portion thereof to be stripped from said underlying metal at or near the location at which it impinges onto said substrate, and such that said resulting wire (CFW) from which has been removed at least one covering is directed to accumulate in said container (CL).

* * * * *